United States Patent
Liu et al.

(10) Patent No.: US 8,871,420 B1
(45) Date of Patent: Oct. 28, 2014

(54) METHOD AND SYSTEM FOR MAGNETIC ACTUATED MIXING TO PREPARE LATEX EMULSION

(71) Applicant: Xerox Corporation, Norwalk, CT (US)

(72) Inventors: Yu Liu, Mississauga (CA); Ke Zhou, Oakville (CA); Yulin Wang, Oakville (CA); Frank Ping-Hay Lee, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/860,474

(22) Filed: Apr. 10, 2013

(51) Int. Cl.
   G03G 9/087  (2006.01)
   B01F 13/08  (2006.01)
   C08K 5/05   (2006.01)
   C08K 5/07   (2006.01)

(52) U.S. Cl.
   CPC ............... *B01F 13/0809* (2013.01); *C08K 5/05* (2013.01); *C08K 5/07* (2013.01)
   USPC .................................................. 430/137.19

(58) Field of Classification Search
   USPC .................................................. 430/137.19
   See application file for complete search history.

(56) References Cited

U.S. PATENT DOCUMENTS

| | | | |
|---|---|---|---|
| 3,590,000 A | 6/1971 | Palermiti |
| 3,644,263 A | 2/1972 | Burke, Jr. |
| 3,800,588 A | 4/1974 | Larson |
| 3,879,327 A | 4/1975 | Burke, Jr. |
| 4,243,566 A | 1/1981 | Burke, Jr. |
| 4,298,672 A | 11/1981 | Lu |
| 4,338,390 A | 7/1982 | Lu |
| 5,026,427 A | 6/1991 | Mitchell |
| 5,028,142 A | 7/1991 | Ostoich |
| 5,085,698 A | 2/1992 | Ma |
| 5,346,797 A | 9/1994 | Kmiecik-Lawrynowicz |
| 5,364,729 A | 11/1994 | Kmiecik-Lawrynowicz |
| 5,403,693 A | 4/1995 | Patel |
| 5,418,108 A | 5/1995 | Kmiecik-Lawrynowicz |
| 5,501,935 A | 3/1996 | Patel |
| 5,527,658 A | 6/1996 | Hopper |
| 5,585,215 A | 12/1996 | Omg |
| 5,650,255 A | 7/1997 | Ng |
| 5,650,256 A | 7/1997 | Veregin |
| 5,835,329 A | 11/1998 | Sucholeiki |
| 5,853,943 A | 12/1998 | Cheng |
| 5,916,725 A | 6/1999 | Patel |
| 6,063,827 A | 5/2000 | Sacripante |
| 6,120,967 A | 9/2000 | Hopper |
| 6,187,270 B1 | 2/2001 | Schmitt |
| 6,214,507 B1 | 4/2001 | Sokol |
| 6,593,049 B1 | 7/2003 | Veregin |

(Continued)

OTHER PUBLICATIONS

Martin et al., "Strong intrinsic mixing in vortex magnetic fields" Physical Review E 80, 016312 (pp. 1-6) (2009).

(Continued)

*Primary Examiner* — Hoa V Le
(74) *Attorney, Agent, or Firm* — Pillsbury Winthrop Shaw Pittman LLP (57) ABSTRACT

A method and system for magnetic actuated mixing which use magnetic particles and magnetic field to facilitate the mixing for preparing latex emulsion. In embodiments, a suitable process includes dissolving a resin in an organic solvent, optionally adding a surfactant, adding a neutralization agent and water, adding magnetic particles, and subjecting the mixture to a magnetic actuated mixing to form a latex emulsion. In embodiments, the latex emulsion thus produced may be utilized to form a toner.

17 Claims, 6 Drawing Sheets

(56) References Cited

U.S. PATENT DOCUMENTS

| | | |
|---|---|---|
| 6,756,176 B2 | 6/2004 | Stegamat |
| 6,764,859 B1 | 7/2004 | Kreuwel |
| 6,830,860 B2 | 12/2004 | Sacripante |
| 7,517,457 B2 | 4/2009 | Siddiqi |
| 7,683,142 B2 | 3/2010 | Lai |
| 7,977,024 B2 | 7/2011 | Zhou |
| 8,124,309 B2 | 2/2012 | Lai |
| 8,163,459 B2 | 4/2012 | Farrugia |
| 8,168,699 B2 | 5/2012 | Lincoln |
| 2006/0063084 A1 | 3/2006 | Sweeney |
| 2006/0222991 A1 | 10/2006 | Sacripante |
| 2007/0207272 A1 | 9/2007 | Puri |

OTHER PUBLICATIONS

Wang et al., "A rapid magnetic particle driven micromixer" Microfluid Nanofluid (2008) 4:375-389.

Rida et al., "Manipulation of Self-Assembled Structures of Magnetic Beads for Microfluidic Mixing and Assaying" Anal. Chem. (2004) 76, 6239-6246.

METHOD AND SYSTEM FOR MAGNETIC ACTUATED MIXING TO PREPARE LATEX EMULSION

CROSS-REFERENCE TO RELATED APPLICATIONS

Reference is made to commonly owned and co-pending, U.S. patent application Ser. No. 13/860,466 entitled "Method and System for Magnetic Actuated Mixing" to Yu Liu et al., electronically filed on the same day herewith; and commonly owned and co-pending, U.S. patent application Ser. No. 13/860,476 entitled "Method and System for Magnetic Actuated Mixing to Prepare Pigment Dispersions" to Yu Liu et al., electronically filed on the same day herewith.

BACKGROUND

The presently disclosed embodiments relate generally to a method and system for magnetic actuated mixing which use magnetic particles and a varying magnetic field to facilitate the mixing to prepare latex emulsions.

Numerous processes are within the purview of those skilled in the art for forming toners. Emulsion aggregation (EA) is one such method. EA toners are generally formed by aggregating a colorant with a latex polymer formed by emulsion polymerization. For example, U.S. Pat. No. 5,853,943, the disclosure of which is hereby incorporated by reference in its entirety, is directed to a semi-continuous emulsion polymerization process for preparing a latex emulsion by first forming a seed polymer. Other methods of emulsion/aggregation/coalescing for preparing toners are illustrated in U.S. Pat. Nos. 3,644,263; 3,879,327; 4,243,566; 5,403,693; 5,418,108; 5,364,729; 5,346,797; 5,527,658; 5,585,215; 5,650,255; 5,650,256; 5,501,935; 7,683,142; 7,977,024; 8,124,309; 8,163,459; and 8,168,699, the disclosures of which are hereby incorporated by reference in their entirety.

Polyester toners have been prepared utilizing amorphous and crystalline polyester resins. The incorporation of these polyester resins into toner requires that the resins first be formulated into emulsions prepared by solvent containing batch processes, for example solvent-based phase inversion emulsification (PIE). PIE is currently the main process of forming emulsified polyester resin latex for use in polyester emulsion aggregation toners. Ammonium hydroxide ($NH_4OH$) is commonly used as a "basic neutralization agent" in the polyester emulsification process. The ammonium hydroxide inverts the resin dissolved oil phase (resin/solvent solution) in water to form a stable aqueous emulsion.

In the PIE process, the type of base or neutralizing agent and ratio of neutralizing agent to resin or solvent plays a very critical role. There are many input process parameters such as resin composition, resin molecular weight and acid value that can vary which make it difficult to emulsify high molecular weight branched amorphous polyester resins to produce the desired particle size range (e.g., 100-250 nm) and a narrow particle size distribution.

Figure 1:
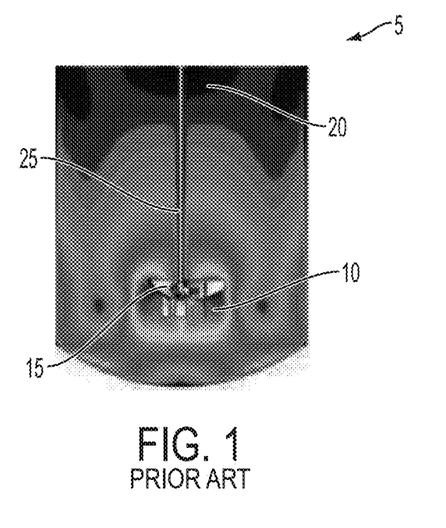
FIG. 1 is a diagram of a conventional mechanical impeller mixing system.

In a batch process for preparing resin latex, the mixing step is one of most critical steps to determine the overall performance of the process. For example, in applications where small-sized particles are produced, achieving the small scale and uniform distribution of the particles is determined by the mixing step. Present mixing methods and systems do not provide uniform mixing efficiency across the entire mixing zone and are only localized at the central mixing point, for example, where the impeller tip is located. As shown in FIG. 1, a typical type of mechanical impeller mixing system 5 has conventionally been used. However, as seen, such systems suffer from non-uniform mixing efficiency across the whole mixing zone and the high mixing field 10 only localized at the impeller tip 15. The mixing strength decays as the distance increases from the impeller 15. Dead spots or shallow spots with inefficient mixing 20 are distributed along the shaft edge 25. Attempts at improvement demonstrated that global uniformity could not be easily handled by the mechanical mixing. Careful selection of a mechanical system to avoid its resonance adds further complexity.

Figure 2:
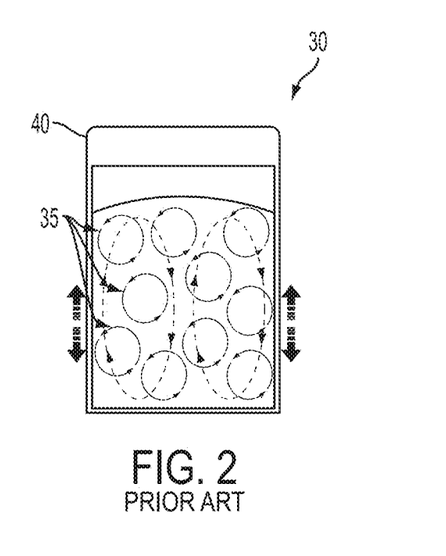
FIG. 2 is a diagram of a conventional acoustic mixing system.

Improvements on mixing methods and systems often generate more complex setups which have their own set of problems, such as increase mechanical maintenance of parts. Recently, acoustic mixing has been used to avoid inefficient mixing. As shown in FIG. 2, an acoustic mixing system 30 uses a non-contact mean to provide micro scale mixing 35 within a micro zone of about 50 µm in a closed vessel 40. However, generating the acoustic wave still relies on mechanical resonance as controlled by engineered plates, eccentric weights and springs. Special care and protection of the mechanism to generate mechanical resonance is typically used and any small turbulence may cause catastrophic damage on the system. Therefore, the overall service life is still limited to the effective lifetime of the mechanical components. Thus, such systems, as exemplified in U.S. Pat. No. 8,124,309, are not free of mechanical maintenance. In addition, the acoustic energy also decays at distances far away from the source.

There is thus a need for a new and improved mixing method and system that overcomes the problems encountered with the conventional systems being used as described above.

SUMMARY

In embodiments, there is provided a method for mixing one or more materials to prepare latex particles, comprising a) contacting a resin with an organic solvent, an optional surfactant, and an optional neutralizing agent in a vessel to form a resin composition in the vessel; b) contacting the resin composition with deionized water (DIW) in the vessel; c) adding magnetic particles into the vessel; and d) applying a varying magnetic field to the magnetic particles to move the magnetic particles to mix the resin composition in the vessel to generate a latex or emulsion, wherein the step of applying the varying magnetic field to the magnetic particles creates a plurality of localized micron or submicron mixing zones providing substantially uniform latex particles.

Another embodiment provides a method for mixing one or more materials to prepare toner particles, comprising a) contacting a resin with an organic solvent and an optional neutralizing agent in a vessel to form a resin composition in the vessel; b) contacting the resin composition with deionized water (DIW) in the vessel; c) adding magnetic particles into the vessel; d) applying a varying magnetic field to the magnetic particles to move the magnetic particles to mix the resin composition in the vessel to generate a latex or emulsion; e) aggregating particles from a pre-toner mixture, the pre-toner mixture comprising the latex or emulsion, an optional colorant, and an optional wax; and f) coalescing the aggregated particles to form toner particles.

In yet another embodiment, there is a system for preparing pigment dispersion, comprising a vessel for holding a resin composition comprising a resin, an organic solvent, an optional surfactant, an optional neutralizing agent, and deionized water, magnetic particles added in the resin composition, a source for applying a varying magnetic field to move the magnetic particles to mix the resin composition for preparing a latex, and a collector for collecting the magnetic particles for re-using at a later time.

BRIEF DESCRIPTION OF THE DRAWINGS

For a better understanding of the present embodiments, reference may be made to the accompanying figures.

DETAILED DESCRIPTION

In the following description, reference is made to the accompanying drawings, which form a part hereof and which illustrate several embodiments. It is understood that other embodiments may be utilized and structural and operational changes may be made without departure from the scope of the present disclosure. The same reference numerals are used to identify the same structure in different figures unless specified otherwise. The structures in the figures are not drawn according to their relative proportions and the drawings should not be interpreted as limiting the disclosure in size, relative size, or location.

Resin

The resin composition may comprise one or more resins, such as two or more resins. The total amount of resin in the resin composition can be from about 1% to 99%, such as from about 10% to about 95%, or from about 20% to 90% by weight of the resin composition.

A resin used in the method disclosed herein may be any latex resin utilized in forming Emulsion Aggregation (EA) toners. Such resins, in turn, may be made of any suitable monomer. Any monomer employed may be selected depending upon the particular polymer to be used. Two main types of EA methods for making toners are known. First is an EA process that forms acrylate based, e.g., styrene acrylate, toner particles. See, for example, U.S. Pat. No. 6,120,967, incorporated herein by reference in its entirety, as one example of such a process. Second is an EA process that forms polyester, e.g., sodio sulfonated polyester. See, for example, U.S. Pat. No. 5,916,725, incorporated herein by reference in its entirety, as one example of such a process.

Illustrative examples of latex resins or polymers selected for the non crosslinked resin and crosslinked resin or gel include, but are not limited to, styrene acrylates, styrene methacrylates, butadienes, isoprene, acrylonitrile, acrylic acid, methacrylic acid, beta-carboxy ethyl arylate, polyesters, known polymers such as poly(styrene-butadiene), poly(m-ethyl styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methyl styrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and the like, and mixtures thereof. The resin or polymer can be a styrene/butyl acrylate/carboxylic acid terpolymer. At least one of the resin substantially free of crosslinking and the cross linked resin can comprise carboxylic acid in an amount of from about 0.05 to about 10 weight percent based upon the total weight of the resin substantially free of cross linking or cross linked resin.

The monomers used in making the selected polymer are not limited, and the monomers utilized may include any one or more of, for example, styrene, acrylates such as methacrylates, butylacrylates, β-carboxy ethyl acrylate (β-CEA), etc., butadiene, isoprene, acrylic acid, methacrylic acid, itaconic acid, acrylonitrile, benzenes such as divinylbenzene, etc., and the like. Known chain transfer agents, for example dodecanethiol or carbon tetrabromide, can be utilized to control the molecular weight properties of the polymer. Any suitable method for forming the latex polymer from the monomers may be used without restriction.

The resin that is substantially free of cross linking (also referred to herein as a non cross linked resin) can comprise a resin having less than about 0.1 percent cross linking. For example, the non cross linked latex can comprise styrene, butylacrylate, and beta-carboxy ethyl acrylate (beta-CEA) monomers, although not limited to these monomers, termed herein as monomers A, B, and C, prepared, for example, by emulsion polymerization in the presence of an initiator, a chain transfer agent (CTA), and surfactant.

The resin substantially free of cross linking can comprise styrene:butylacrylate:beta-carboxy ethyl acrylate wherein, for example, the non cross linked resin monomers can be present in an amount of about 70 percent to about 90 percent styrene, about 10 percent to about 30 percent butylacrylate, and about 0.05 parts per hundred to about 10 parts per hundred beta-CEA, or about 3 parts per hundred beta-CEA, by weight based upon the total weight of the monomers, although not limited. For example, the carboxylic acid can be selected, for example, from the group comprised of, but not limited to, acrylic acid, methacrylic acid, itaconic acid, beta carboxy ethyl acrylate (beta CEA), fumaric acid, maleic acid, and cinnamic acid.

In a feature herein, the non cross linked resin can comprise about 73 percent to about 85 percent styrene, about 27 percent to about 15 percent butylacrylate, and about 1.0 part per hundred to about 5 parts per hundred beta-CEA, by weight based upon the total weight of the monomers although the compositions and processes are not limited to these particular types of monomers or ranges. In another feature, the non cross linked resin can comprise about 81.7 percent styrene, about 18.3 percent butylacrylate and about 3.0 parts per hundred beta-CEA by weight based upon the total weight of the monomers.

The initiator can be, for example, but is not limited to, sodium, potassium or ammonium persulfate and can be present in the range of, for example, about 0.5 to about 3.0 percent based upon the weight of the monomers, although not limited. The CTA can be present in an amount of from about 0.5 to about 5.0 percent by weight based upon the combined weight of the monomers A and B, although not limited. The surfactant can be an anionic surfactant present in the range of from about 0.7 to about 5.0 percent by weight based upon the weight of the aqueous phase, although not limited to this type or range.

The resin can be a polyester resin such as an amorphous polyester resin, a crystalline polyester resin, and/or a combination thereof. The polymer used to form the resin can be a polyester resin described in U.S. Pat. Nos. 6,593,049 and 6,756,176, the disclosures of each of which are hereby incorporated by reference in their entirety. Suitable resins also include a mixture of an amorphous polyester resin and a crystalline polyester resin as described in U.S. Pat. No. 6,830,860, the disclosure of which is hereby incorporated by reference in its entirety.

The resin can be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanedial, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol may be, for example, selected in an amount of from about 40 to about 60 mole percent, such as from about 42 to about 55 mole percent, or from about 45 to about 53 mole percent (although amounts outside of these ranges can be used), and the alkali sulfo-aliphatic diol can be selected in an amount of from about 0 to about 10 mole percent, such as from about 1 to about 4 mole percent of the resin (although amounts outside of these ranges can be used).

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, from about 40 to about 60 mole percent, in embodiments from about 42 to about 52 mole percent, such as from about 45 to about 50 mole percent (although amounts outside of these ranges can be used), and the alkali sulfo-aliphatic diacid can be selected in an amount of from about 1 to about 10 mole percent of the resin (although amounts outside of these ranges can be used).

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin can be present, for example, in an amount of from about 5 to about 50 percent by weight of the toner components, such as from about 10 to about 35 percent by weight of the toner components (although amounts outside of these ranges can be used). The crystalline resin can possess various melting points of, for example, from about 30° C. to about 120° C., in embodiments from about 50° C. to about 90° C. (although melting points outside of these ranges can be obtained). The crystalline resin can have a number average molecular weight (Mn), as measured by gel permeation chromatography (GPC) of, for example, from about 1,000 to about 50,000, such as from about 2,000 to about 25,000 (although number average molecular weights outside of these ranges can be obtained), and a weight average molecular weight (Mw) of, for example, from about 2,000 to about 100,000, such as from about 3,000 to about 80,000 (although weight average molecular weights outside of these ranges can be obtained), as determined by Gel Permeation Chromatography using polystyrene standards. The molecular weight distribution (Mw/Mn) of the crystalline resin can be, for example, from about 2 to about 6, in embodiments from about 3 to about 4 (although molecular weight distributions outside of these ranges can be obtained).

Examples of diacids or diesters including vinyl diacids or vinyl diesters used for the preparation of amorphous polyesters include dicarboxylic acids or diesters such as terephthalic acid, phthalic acid, isophthalic acid, fumaric acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecane diacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester can be present, for example, in an amount from about 40 to about 60 mole percent of the resin, such as from about 42 to about 52 mole percent of the resin, or from about 45 to about 50 mole percent of the resin (although amounts outside of these ranges can be used).

Examples of diols that can be used in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and combinations thereof. The amount of organic diol selected can vary, and can be present, for example, in an amount from about 40 to about 60 mole percent of the resin, such as from about 42 to about 55 mole percent of the resin, or from about 45 to about 53 mole percent of the resin (although amounts outside of these ranges can be used).

Polycondensation catalysts which may be used in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be used in amounts of, for example, from about 0.01 mole percent to about 5 mole percent based on the starting diacid or diester used to generate the polyester resin (although amounts outside of this range can be used).

Suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be used include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfoisophthalate), copoly propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

An unsaturated amorphous polyester resin can be used as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof. A suitable polyester resin can be a polyalkoxylated bisphenol A-co-terephthalic acid/dodecenylsuccinic acid/trimellitic acid resin, or a polyalkoxylated bisphenol A-co-terephthalic acid/fumaric acid/dodecenylsuccinic acid resin, or a combination thereof.

Such amorphous resins can have a weight average molecular weight (Mw) of from about 10,000 to about 100,000, such as from about 15,000 to about 80,000.

An example of a linear propoxylated bisphenol a fumarate resin that can be used as a latex resin is available under the trade name SPARII from Resana S/A Industrias Quimicas, Sao Paulo Brazil. Other propoxylated bisphenol a fumarate resins that can be used and are commercially available include GTUF and FPESL-2 from Kao Corporation, Japan, and EM181635 from Reichhold, Research Triangle Park, North Carolina, and the like.

Suitable crystalline resins that can be used, optionally in combination with an amorphous resin as described above, include those disclosed in U.S. Patent Application Publication No. 2006/0222991, the disclosure of which is hereby incorporated by reference in its entirety. In embodiments, a suitable crystalline resin can include a resin formed of dodecanedioic acid and 1,9-nonanediol.

Such crystalline resins can have a weight average molecular weight (Mw) of from about 10,000 to about 100,000, such as from about 14,000 to about 30,000.

For example, a polyalkoxylated bisphenol A-co-terephthalic acid/dodecenylsuccinic acid/trimellitic acid resin, or a polyalkoxylated bisphenol A-co-terephthalic acid/fumaric acid/dodecenylsuccinic acid resin, or a combination thereof, can be combined with a polydodecanedioic acid-co-1,9-nonanediol crystalline polyester resin.

The resins can have a glass transition temperature of from about 30° C. to about 80° C., such as from about 35° C. to about 70° C. The resins can have a melt viscosity of from about 10 to about 1,000,000 Pa*S at about 130° C., such as from about 20 to about 100,000 Pa*S. One, two, or more toner resins may be used. Where two or more toner resins are used, the toner resins can be in any suitable ratio (e.g., weight ratio) such as, for instance, about 10 percent (first resin)/90 percent (second resin) to about 90 percent (first resin)/10 percent (second resin). The resin can be formed by emulsion polymerization methods.

The resin can be formed at elevated temperatures of from about 30° C. to about 200° C., such as from about 50° C. to about 150° C., or from about 70° C. to about 100° C. However, the resin can also be formed at room temperature.

Stirring may be used to enhance formation of the resin. Any suitable stirring device may be used. In embodiments, the stirring speed can be from about 10 revolutions per minute (rpm) to about 5,000 rpm, such as from about 20 rpm to about 2,000 rpm, or from about 50 rpm to about 1,000 rpm. The stirring speed can be constant or the stirring speed can be varied. For example, as the temperature becomes more uniform throughout the mixture, the stirring speed can be increased. However, no mechanical or magnetic agitation is necessary in the method disclosed herein.

Solvent

Any suitable organic solvent can be contacted with the resin in the resin composition to help dissolve the resin in the resin composition. Suitable organic solvents for the methods disclosed herein include alcohols, such as methanol, ethanol, isopropanol, butanol, as well as higher homologs and polyols, such as ethylene glycol, glycerol, sorbitol, and the like; ketones, such as acetone, 2-butanone, 2-pentanone, 3-pentanone, ethyl isopropyl ketone, methyl isobutyl ketone, diisobutyl ketone, and the like; amides, such as dimethylformamide, dimethylacetamide, N-methylpyrrolidone, 1,2-dimethyl-2-imidazolidinone, and the like; nitriles, such as acetonitrile, propionitrile, butyronitrile, isobutyronitrile, valeronitrile, benzonitrile, and the like; ethers, such as ditert-butyl ether, dimethoxyethane, 2-methoxyethyl ether, 1,4-dioxane, tetrahydrohyran, morpholine, and the like; sulfones, such as methylsulfonylmethane, sulfolane, and the like; sulfoxides, such as dimethylsulfoxide; phosphoramides, such as hexamethylphosphoramide; benzene and benzene derivatives; as well as esters, amines and combinations thereof, in an amount of, for example from about 1 wt % to 99 wt %, from about 20 wt % to 80 wt %, or from about 20 wt % to about 50 wt %.

The organic solvent can be immiscible in water and can have a boiling point of from about 30° C. to about 100° C. Any suitable organic solvent can also be used as a phase or solvent inversion agent. The organic solvent can be used in an amount of from about 1% by weight to about 25% by weight of the resin, such as from about 5% by weight to about 20% by weight of the resin, or from about 10% by weight of the resin to about 15% by weight of the resin.

Neutralizing Agent

A neutralizing agent can be contacted with the resin in the resin composition to, for example, neutralize acid groups in the resins. The neutralizing agent can be contacted with the resin as a solid or in an aqueous solution. The neutralizing agent herein can also be referred to as a "basic neutralization agent." Any suitable basic neutralization reagent can be used in accordance with the present disclosure.

Suitable basic neutralization agents include both inorganic basic agents and organic basic agents. Suitable basic agents include, for example, ammonium hydroxide, potassium hydroxide, sodium hydroxide, sodium carbonate, sodium bicarbonate, lithium hydroxide, potassium carbonate, potassium bicarbonate, combinations thereof, and the like. Suitable basic agents also include monocyclic compounds and polycyclic compounds having at least one nitrogen atom, such as, for example, secondary amines, which include aziridines, azetidines, piperazines, piperidines, pyridines, pyridine derivatives, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, triethyl amines, triethaholamines, diphenyl amines, diphenyl amine derivatives, poly(ethylene amine), poly(ethylene amine derivatives, amine bases, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. The monocyclic and polycyclic compounds can be unsubstituted or substituted at any carbon position on the ring.

The basic agent can be used as a solid such as, for example, sodium hydroxide flakes, so that it is present in an amount of from about 0.001% by weight to 50% by weight of the resin, such as from about 0.01% by weight to about 25% by weight of the resin, or from about 0.1% by weight to 5% by weight of the resin.

As noted above, the basic neutralization agent can be added to a resin possessing acid group. The addition of the basic neutralization agent may thus raise the pH of an emulsion including a resin possessing acid group to a pH of from about 5 to about 12, in embodiments, from about 6 to about 11. The neutralization of the acid groups can enhance formation of the emulsion.

The neutralization ratio can be from about 25% to about 500%, such as from about 50% to about 450%, or from about 100% to about 400%.

Surfactant

As discussed above, a surfactant can be contacted with the resin prior to formation of the resin composition used to form the latex emulsion. One, two, or more surfactants can be used. The surfactants can be selected from ionic surfactants and nonionic surfactants. The latex for forming the resin used in forming a toner can be prepared in an aqueous phase containing a surfactant or co-surfactant, optionally under an inert gas such as nitrogen. Surfactants used with the resin to form a latex dispersion can be ionic or nonionic surfactants in an amount of from about 0.01 to about 15 weight percent of the solids, such as from about 0.1 to about 10 weight percent of the solids.

Anionic surfactants that can be used include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN®, NEOGEN SC™ obtained from Daiichi Kogyo Seiyaku Co., Ltd., combinations thereof, and the like. Other suitable anionic surfactants include, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants can be used.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. A suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. Commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be used.

The choice of particular surfactants or combinations thereof, as well as the amounts of each to be used, are within the purview of those skilled in the art.

Processing

Figure 3:
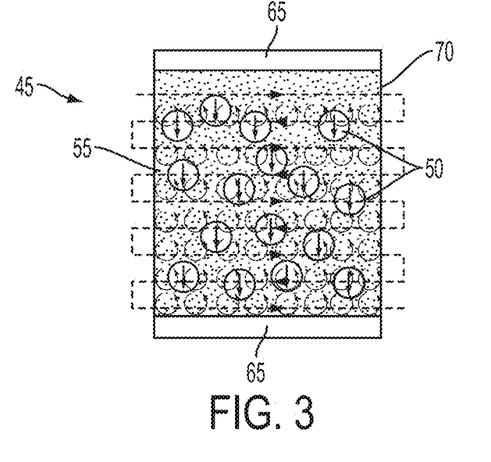
FIG. 3 is a diagram of a magnetic actuated mixing system in accordance with the present embodiments.

The present embodiments provide a method and system for magnetic actuated mixing which use magnetic particles and electromagnetic field to facilitate the mixing for preparing resin latex. In embodiments, the method and system is used for improved mixing in batch processes. As shown in FIG. 3, there is provided a mixing system 45 comprising magnetic particles 50 loaded in a solution 55 which is moved to actuate mixing by the periodic variation of a magnetic field applied to the magnetic particles 50. The magnetic particles may be pre-loaded or filled into the mixing vessel 70 when mixing is needed. The magnetic field is applied through electromagnets 65 on either side of the mixing vessel 70. The mixing system 45 achieves intense micro mixing zone 75 uniformly throughout the mixing vessel 70. The magnetic particles can be successfully collected and recycled by a magnet for subsequent applications.

The magnetic particles may be comprised of, paramagnetic, ferrimagnetic, ferromagnetic or antiferromagnetic materials. The magnetic particles may further be comprised of a material selected from the group consisting of Fe, $Fe_2O_3$, Ni, $CrO_2$, Cs, and the like or mixtures thereof. In embodiments, the magnetic particles have a non-magnetic coating. In other embodiments, the magnetic particles can also be encapsulated with a shell, for example, a polymeric shell comprising, in embodiments, polystyrene, polyvinyl chloride, TEFLON®, PMMA, and the like and mixtures thereof. The magnetic particles may have a diameter of from about 5 nm to about 50 μm, or from about 10 nm to about 10 μm, or from about 100 nm to about 5 μm. The volume percentage of magnetic particles can be chosen based on different applications or processes. In embodiments, the number of magnetic particles used for mixing may also vary depending on the different application or process for which the particles are being used. For example, from about 5% to about 80%, or from about 10% to about 50%, or from about 15% to about 25% magnetic particles may be added to the vessel. The magnetic field may have a strength of from about 500 Gauss to about 50,000 Gauss, or from about 1000 Gauss to about 20,000 Gauss, or from about 2000 Gauss to about 15,000 Gauss. In embodiments, the electromagnets are circularly patterned with a uniform angular spacing. In embodiments, the electromagnets are used to apply the varying (switchable) magnetic field in a circular motion on a micro- or nano-scale. The magnetic field may also be applied in an up and down, or left and right, or triangular motion. In specific embodiments, the varying magnetic field is applied by moving a permanent magnet. In embodiments, the varying magnetic field is biased by another constant magnetic field. The flexible system setup is not limited by the geometry of mixing vessel 80.

The present embodiments are able to drive chaotic or random motion of magnetic particles across the whole solution at a micro scale. This type of random motion generates turbulence and helps facilitate a mixing of the materials being mixed to achieve optimal particle size. Every magnetic particle provides an independent mixing zone, and together generate bulk mixing which achieves an accumulative effect. The mixing is efficient and uniform across the entire mixing zone because of the uniform magnetic field distribution. If micro sized magnetic particles are used, due to the large surface contact area between micro magnetic particles and multiphase solution, micro mixing and micro milling due to enhanced local diffusion significantly produces homogeneous and global mixing. The present embodiments thus provide small particles on the nano to micro scale and uniform distribution. The present embodiments also provide for the potential of higher viscosity (for example, a viscosity of from about 0.1 cP to about 100,000 cP at 25° C.) mixing if the exposed magnetic field is large.

Another advantage of the present method and system is the fact that it is free of mechanical components and thus maintenance, which significantly reduces the cost of the system. The present embodiments are also free of noise.

In embodiments, the cyclic magnetic field is used to actuate chaotic motion of micro or nano magnetic particles uniformly throughout whole reaction vessel to prepare resin latex with the required particle sizes. In these embodiments, magnetic particles, which are first dispersed in a solvent containing resin solution, are capable of creating micron/submicron mixing zones (depending on the magnetic particle size) with enhanced localization. Such features provide uniformity and facilitate increase in mixing speed.

Figure 4:
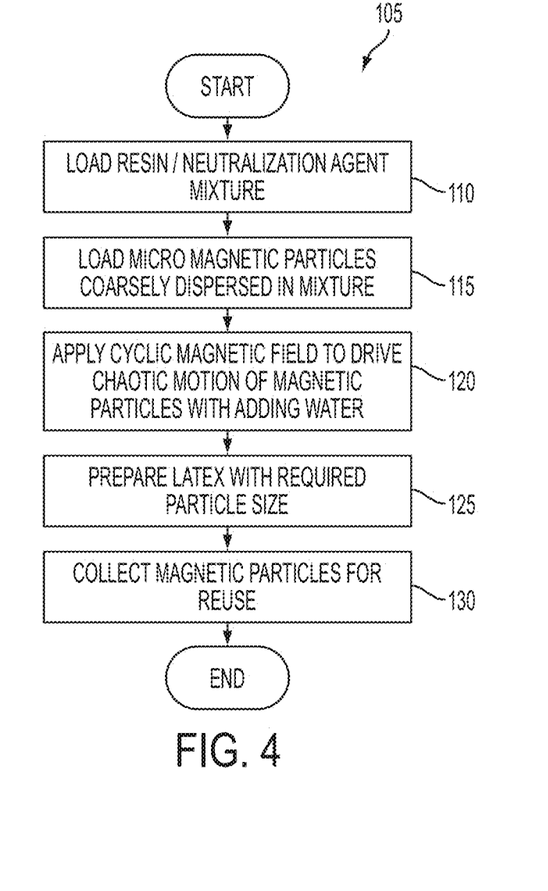
FIG. 4 is a flow chart illustrating a method for preparing an emulsion aggregation (EA) toner in accordance with the present embodiments.

In embodiments, there is provided a method for preparing resin latex using magnetic actuated mixing 105 as shown in FIG. 4. A resin (dissolved in solvent) and neutralization agent mixture is loaded into the reaction vessel 110. An optional surfactant may also be added. In embodiments, the solvent is selected from the group consisting of a ketone, an alcohol, an ester, an ether, a nitrile, a sulfone, a sulfoxide, a phosphoramide, a benzene, a benzene derivative, an amine, and mixtures thereof. In embodiments, the resin is selected from the group consisting of polyester, polyacrylate, polyolefin, polystyrene, polycarbonate, polyamide, polyimide, and mixtures thereof. In embodiments, the neutralization agent is selected from the group consisting of ammonium hydroxide, sodium carbonate, potassium hydroxide, sodium hydroxide, sodium bicarbonate, lithium hydroxide, potassium carbonate, triethyl amine, triethanolamine, pyridine, pyridine derivatives, diphenylamine, diphenylamine derivatives, poly(ethylene amine), poly(ethylene amine) derivatives, amine bases, and piperazine, and mixtures thereof. In embodiments, a neutralization ratio of the neutralization agent in the latex or emulsion is from about 25% to about 500%, or from about 50% to about 150%, or from about 70% to about 90%. In embodiments, the surfactant is selected from ionic surfactants, nonionic surfactants, and mixtures thereof.

The reaction vessel may have the magnetic particles already pre-loaded in the vessel or the magnetic particles may be loaded into the reaction vessel after the resin/neutralization agent mixture 115. A magnetic field is applied to the resin/neutralization mixture and magnetic particles 120. Water may be added in this step. A latex with the desired particle size is then achieved by continued mixing of the magnetic particles through application of the magnetic field 125. In embodiments, the latex or emulsion has distribution of particle size from about 5 nm to about 1,000 nm.

Preparation of Toner

As discussed above, the latex emulsion produced according to the method disclosed herein can be used to form a toner, such as an EA toner. The latex emulsion can be added to a pre-toner mixture, such as before particle aggregation in the EA coalescence process. The latex or emulsion, as well as a binder resin, a wax such as a wax dispersion, a colorant, and any other desired or required additives such as surfactants, may form the pre-toner mixture.

The pre-toner mixture can be prepared, and the pH of the resulting mixture can be adjusted, by an acid such as, for example, acetic acid, nitric acid or the like. The pH of the mixture can be adjusted to be from about 4 to about 5, although a pH outside this range can be used. Additionally, the mixture can be homogenized. If the mixture is homogenized, homogenization can be accomplished by mixing at a mixing speed of from about 600 to about 4,000 revolutions per minute, although speeds outside this range can be used. Homogenization can be accomplished by any suitable means, including, for example, an IKA ULTRA TURRAX T50 probe homogenizer.

Aggregation

Following the preparation of the above mixture, including the addition or incorporation into the pre-toner mixture of the latex emulsion produced by the methods disclosed herein, an aggregating agent can be added to the mixture. Any suitable aggregating agent can be used to form a toner. Suitable aggregating agents include, for example, aqueous solutions of a divalent cation or a multivalent cation material. The aggregating agent can be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. The aggregating agent can be added to the mixture at a temperature that is below the glass transition temperature (TG) of the resin.

The aggregating agent can be added to the mixture used to form a toner in an amount of, for example, from about 0.01 percent to about 8 percent by weight, such as from about 0.1 percent to about 1 percent by weight, or from about 0.15 percent to about 0.8 percent by weight, of the resin in the mixture, although amounts outside these ranges can be used. The above can provide a sufficient amount of agent for aggregation.

To control aggregation and subsequent coalescence of the particles, the aggregating agent can be metered into the mixture over time. For example, the agent can be metered into the mixture over a period of from about 5 to about 240 minutes, such as from about 30 to about 200 minutes, although more or less time can be used as desired or required. The addition of the agent can occur while the mixture is maintained under stirred conditions, such as from about 50 revolutions per minute to about 1,000 revolutions per minute, or from about 100 revolutions per minute to about 500 revolutions per minute, although speeds outside these ranges can be used. The addition of the agent can also occur while the mixture is maintained at a temperature that is below the glass transition temperature of the resin discussed above, such as from about 30° C. to about 90° C., or from about 35° C. to about 70° C., although temperatures outside these ranges can be used.

The particles can be permitted to aggregate until a predetermined desired particle size is obtained. A predetermined desired size refers to the desired particle size to be obtained as determined prior to formation, and the particle size being monitored during the growth process until such particle size is reached. Samples can be taken during the growth process and analyzed, for example with a Coulter Counter, for average particle size. The aggregation thus can proceed by maintaining the elevated temperature, or slowly raising the temperature to, for example, from about 30° C. to about 99° C., and holding the mixture at this temperature for a time from about 0.5 hours to about 10 hours, such as from about hour 1 to about 5 hours (although times outside these ranges may be utilized), while maintaining stirring, to provide the aggregated particles. Once the predetermined desired particle size is reached, then the growth process is halted. The predetermined desired particle size can be within the desired size of the final toner particles.

The growth and shaping of the particles following addition of the aggregation agent can be accomplished under any suitable conditions. For example, the growth and shaping can be conducted under conditions in which aggregation occurs separate from coalescence. For separate aggregation and coalescence stages, the aggregation process can be conducted under shearing conditions at an elevated temperature, for example, of from about 40° C. to about 90° C., such as from about 45° C. to about 80° C. (although temperatures outside these ranges may be utilized), which can be below the glass transition temperature of the resin as discussed above.

Once the desired final size of the toner particles is achieved, the pH of the mixture can be adjusted with a base to a value of from about 3 to about 10, such as from about 5 to about 9, although a pH outside these ranges may be used.

The adjustment of the pH can be used to freeze, that is to stop, toner growth. The base utilized to stop toner growth can include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Core-Shell Structure

After aggregation, but prior to coalescence, a resin coating can be applied to the aggregated particles to form a shell thereover. Any resin described above as suitable for forming the toner resin can be used as the shell.

Resins that can be used to form a shell include, but are not limited to, crystalline polyesters described above, and/or the amorphous resins described above for use as the core. For example, a polyalkoxylated bisphenol A-co-terephthalic acid/dodecenylsuccinic acid/trimellitic acid resin, a polyalkoxylated bisphenol A-co-terephthalic acid/fumaric acid/dodecenylsuccinic acid resin, or a combination thereof, can be combined with a polydodecanedioic acid-co-1,9-nonanediol crystalline polyester resin to form a shell. Multiple resins can be used in any suitable amounts.

The shell resin can be applied to the aggregated particles by any method within the purview of those skilled in the art. The resins utilized to form the shell can be in an emulsion including any surfactant described above. The emulsion possessing the resins can be combined with the aggregated particles described above so that the shell forms over the aggregated particles. In embodiments, the shell may have a thickness of up to about 5 microns, such as from about 0.1 to about 2 microns, or from about 0.3 to about 0.8 microns, over the formed aggregates, although thicknesses outside of these ranges may be obtained.

The formation of the shell over the aggregated particles can occur while heating to a temperature of from about 30° C. to about 80° C. in embodiments from about 35° C. to about 70° C., although temperatures outside of these ranges can be utilized. The formation of the shell can take place for a period of time of from about 5 minutes to about 10 hours, such as from about 10 minutes to about 5 hours, although times outside these ranges may be used.

For example, the toner process can include forming a toner particle by mixing the polymer latexes, in the presence of a wax dispersion and a colorant with an optional coagulant while blending at high speeds. The resulting mixture having a pH of, for example, of from about 2 to about 3, can be aggregated by heating to a temperature below the polymer resin Tg to provide toner size aggregates. Optionally, additional latex can be added to the formed aggregates providing a shell over the formed aggregates. The pH of the mixture can be changed, for example, by the addition of a sodium hydroxide solution, until a pH of about 7 may be achieved.

Coalescence

Following aggregation to the desired particle size and application of any optional shell, the particles can be coalesced to the desired final shape. The coalescence can be achieved by, for example, heating the mixture to a temperature of from about 45° C. to about 100° C., such as from about 55° C. to about 99° C. (although temperatures outside of these ranges may be used), which can be at or above the glass transition temperature of the resins used to form the toner particles, and/or reducing the stirring, for example, to a stirring speed of from about 100 revolutions per minute to about 1,000 revolutions per minute, such as from about 200 revolutions per minute to about 800 revolutions per minute (although speeds outside of these ranges may be used). The fused particles can be measured for shape factor or circularity, such as with a Sysmex FPIA 2100 analyzer, until the desired shape is achieved.

Higher or lower temperatures can be used, it being understood that the temperature is a function of the resins used for the binder. Coalescence may be accomplished over a period of from about 0.01 hours to about 9 hours, such as from about 0.1 hours to about 4 hours (although times outside of these ranges can be used).

After aggregation and/or coalescence, the mixture can be cooled to room temperature, such as from about 20° C. to about 25° C. The cooling can be rapid or slow, as desired. Suitable cooling methods include introducing cold water to a jacket around the reactor. After cooling, the toner particles can be washed with water, and then dried. Drying can be accomplished by any suitable method for drying including, for example, freeze-drying.

Wax

A wax can be combined with the latex or emulsion, colorant, and the like in forming toner particles. When included, the wax can be present in an amount of, for example, from about 1 weight percent to about 25 weight percent of the toner particles, such as from about 5 weight percent to about 20 weight percent of the toner particles, although amounts outside these ranges can be used.

Suitable waxes include waxes having, for example, a weight average molecular weight of from about 500 to about 20,000, such as from about 1,000 to about 10,000, although molecular weights outside these ranges may be utilized. Suitable waxes include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that can be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes can be used. Waxes can be included as, for example, fuser roll release agents.

Colorant

The toner particles described herein can further include colorant. Colorant includes pigments, dyes, mixtures of dyes, mixtures of pigments, mixtures of dyes and pigments, and the like.

When present, the colorant can be added in an effective amount of, for example, from about 1 to about 25 percent by weight of the particle, such as from about 2 to about 12 weight percent. Suitable colorants include, for example, carbon black like REGAL 330®. As colored pigments, there may be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components can also be selected as colorants. Other known colorants may be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Suitable colorants include those comprising carbon black, such as, REGAL 330® and Nipex 35. Colored pigments, such as, cyan, magenta, yellow, red, orange, green, brown, blue or mixtures thereof can be used. The additional pigment or pigments can be used as water-based pigment dispersions. Suitable colorants include inorganic pigments and organic pigments. Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE 1™ available from Paul Uhlich & Company, Inc.; PIGMENT VIOLET 1™, PIGMENT RED 48™, LEMON CHROME YELLOW DCC1026™, TOLUIDINE RED™ and BON RED C™ available from Dominion Color Corporation, Ltd., Toronto, Ontario; NOVAPERM YELLOW FGL™ and HOSTAPERM PINK E™ from Hoechst; CINQUASIA MAGENTA™ available from E.I. DuPont de Nemours & Co., and the like. Examples of magenta pigments include 2,9-dimethyl-substituted quinacridone, an anthraquinone dye identified in the Color Index as CI 60710, CI Dispersed Red 15, a diazo dye identified in the Color Index as CI 26050, CI Solvent Red 19 and the like. Illustrative examples of cyan pigments include copper tetra(octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI 69810, Special Blue X-2137 and the like. Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3,2,5-dimethoxy-4-sulfonanilide phenylazo-4'-chloro-2,5-dimethoxy acetoacetanilide and Permanent Yellow FGL.

Examples of inorganic pigments include such as, Ultramarine violet: (PV15) Silicate of sodium and aluminum containing sulfur; Han Purple: $BaCuSi_2O_6$; Cobalt Violet: (PV14) cobalt phosphate; Manganese Violet: (PV16) Manganese ammonium phosphate; Ultramarine (PB29): a complex naturally occurring pigment of sulfur-containing sodio-silicate $(Na_{8-10}Al_6Si_6O_{24}S_{2-4})$; Cobalt Blue (PB28) and Cerulean Blue (PB35): cobalt(II) stannate; Egyptian Blue: a synthetic pigment of calcium copper silicate $(CaCuSi_4O_{10})$; Han Blue: $BaCuSi_4O_{10}$; Prussian Blue (PB27): a synthetic pigment of ferric hexacyanoferrate $(Fe_7(CN)_{18})$. The dye Marking blue is made by mixing Prussian Blue and alcohol; $YIn_{1-x}Mn_xO_3$: a synthetic pigment made from inserting Mn into the trigonal bipyramidal atomic site of the $YInO_3$ crystal structure.Cadmium Green: a light green pigment consisting of a mixture of Cadmium Yellow (CdS) and Viridian ($Cr_2O_3$); Chrome Green (PG17); Viridian (PG18): a dark green pigment of hydrated chromium(III) oxide ($Cr_2O_3$); Paris Green: copper(II) acetoarsenite; $(Cu(C_2H_3O_2)_2.3Cu(AsO_2)_2)$; Scheele's Green (also called Schloss Green): copper arsenite $CuHAsO_3$; Orpiment natural monoclinic arsenic sulfide ($As_2S_3$); Cadmium Yellow (PY37): cadmium sulfide (CdS); Chrome Yellow (PY34): natural pigment of lead(II) chromate ($PbCrO_4$); Aureolin (also called Cobalt Yellow) (PY40): Potassium cobaltinitrite ($Na_3Co(NO_2)_6$; Yellow Ochre (PY43): a naturally occurring clay of hydrated iron oxide ($Fe_2O_3.H_2O$); Naples Yellow (PY41); Titanium Yellow (PY53); Mosaic gold: stannic sulfide ($SnS_2$); Cadmium Orange (PO20): an intermediate between cadmium red and cadmium yellow: cadmium sulfoselenide; Chrome Orange: a naturally occurring pigment mixture composed of lead(II) chromate and lead(II) oxide. ($PbCrO_4+PbO$); Cadmium Red (PR108): cadmium selenide (CdSe); Sanguine, Caput Mortuum, Venetian Red, Oxide Red (PR102); Burnt Sienna (PBr7): a pigment produced by heating Raw Sienna; Carbon Black (PBk7); Ivory Black (PBk9); Vine Black (PBk8); Lamp Black (PBk6); Titanium Black; Antimony White: $Sb_2O_3$; Barium sulfate (PW5); Titanium White (PW6): titanium(IV) oxide $TiO_2$; Zinc White (PW4): Zinc Oxide (ZnO)

Other known colorants can be used, such as, Levanyl Black A-SF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01

(American Hoechst), Sunsperse Blue BHD 6000 (Sun Chemicals), Irgalite Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), SUCD-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Other pigments that can be used, and which are commercially available include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

The colorant, for example carbon black, cyan, magenta and/or yellow colorant, may be incorporated in an amount sufficient to impart the desired color to the toner. In general, pigment or dye, may be employed in an amount ranging from about 2% to about 35% by weight of the toner particles on a solids basis, from about 5% to about 25% by weight or from about 5% to about 15% by weight.

Other Additives

The toner particles can contain other optional additives, as desired or required. For example, the toner can include positive or negative charge control agents, for example, in an amount of from about 0.1 to about 10 percent by weight of the toner, such as from about 1 to about 3 percent by weight of the toner (although amounts outside of these ranges may be used). Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents can be applied simultaneously with the shell resin described above or after application of the shell resin.

External additive particles can be blended with the toner particles after formation including flow aid additives, which additives can be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica can be applied to the toner surface for toner flow, tribo enhancement, admix control, improved development and transfer stability, and higher toner blocking temperature. TiO2 may be applied for improved relative humidity (RH) stability, tribo control and improved development and transfer stability. Zinc stearate, calcium stearate and/or magnesium stearate can be used as an external additive for providing lubricating properties, developer conductivity, tribo enhancement, enabling higher toner charge and charge stability by increasing the number of contacts between toner and carrier particles. A commercially available zinc stearate known as Zinc Stearate L, obtained from Ferro Corporation, can be used. The external surface additives can be used with or without a coating.

Each of these external additives can be present in an amount of from about 0.1 percent by weight to about 5 percent by weight of the toner, such as from about 0.25 percent by weight to about 3 percent by weight of the toner, although the amount of additives can be outside of these ranges. The toners may include, for example, from about 0.1 weight percent to about 5 weight percent titanium dioxide, such as from about 0.1 weight percent to about 8 weight percent silica, or from about 0.1 weight percent to about 4 weight percent zinc stearate (although amounts outside of these ranges may be used). Suitable additives include those disclosed in U.S. Pat. Nos. 3,590,000, 3,800,588, and 6,214,507, the disclosures of each of which are hereby incorporated by reference in their entirety. Again, these additives can be applied simultaneously with the shell resin described above or after application of the shell resin.

The toner particles can have a weight average molecular weight (Mw) in the range of from about 17,000 to about 80,000 daltons, a number average molecular weight (Mn) of from about 3,000 to about 10,000 daltons, and a MWD (a ratio of the Mw to Mn of the toner particles, a measure of the polydispersity, or width, of the polymer) of from about 2.1 to about 10 (although values outside of these ranges can be obtained).

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

The embodiments will be described in further detail with reference to the following examples and comparative examples. All the "parts" and "%" used herein mean parts by weight and % by weight unless otherwise specified.

Comparative Example 1

This comparative example was done as control to show original particle size and particle size distribution of an emulsion aggregation toner as prepared with conventional phase inversion emulsification (PIE).

Figure 5:
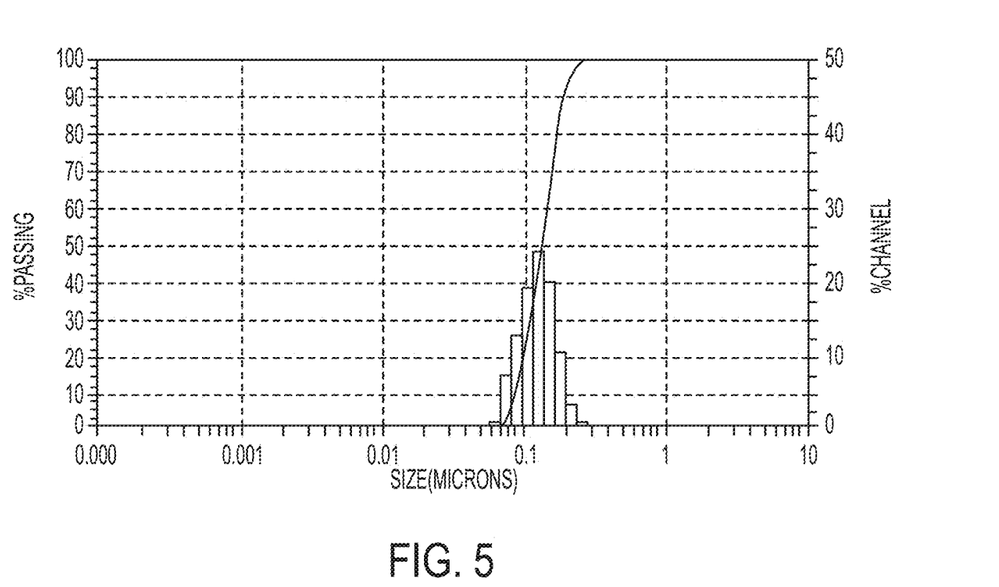
FIG. 5 is a graph illustrating particle size and particle size distribution of the latex made in Comparative Example 1.

10 g amorphous polyester resin 1 (Mw=44120, Tg onset=56.8° C.) was dissolved in 20 g methyl ethyl ketone and 2 g iso-propyl alcohol solvent mixture with stirring at room temperature. 3.24 g of the mixture was transferred to a 10 ml glass vial. 0.025 grams of 10 wt % $NH_3.H_2O$ solution was then added to neutralize the resin. Then the mixture was mixed by hand shaking. About 3.2 grams of DIW was added drop-wise to the mixture at intervals with hand shaking. The average particle size is about 129 nm as shown in FIG. 5.

Example 1

Figure 6:
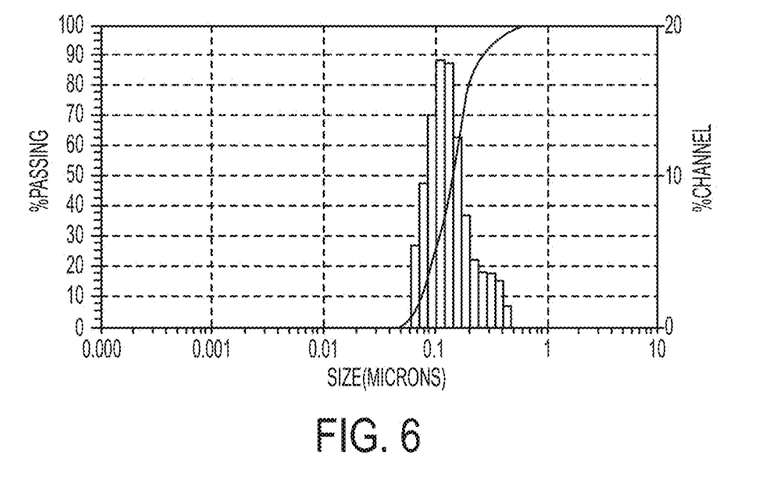
FIG. 6 is a graph illustrating particle size and particle size distribution of the latex made in Example 1.

This example was prepared with the magnetic actuated mixing of the present embodiments. 10 g amorphous polyester resin 1 (Mw=44120, Tg onset=56.8° C.) was dissolved in 20 g methyl ethyl ketone and 2 g iso-propyl alcohol solvent mixture with stirring at room temperature. 1.62 g of the mixture was transferred to a 10 ml glass vial with 0.5 g micro magnetic particles (Carbonyl Iron Powder from Royalink Industries Corp., average particle size about 4 to 5 μm). 0.017 grams of 10 wt % $NH_3.H_2O$ solution was then added to neutralize the resin. Then the mixture was mixed by magnetic particles through turning a 15,000 Gauss permanent magnet next to the vial for about 1 min. About 1.5 grams of DIW was added drop-wise to the mixture at intervals with mixing with magnetic particles. The average particle size is about 125 nm as shown in FIG. 6.

Comparative Example 2

This comparative example was also done as control to show original particle size of latex prepared with conventional method.

Figure 7:
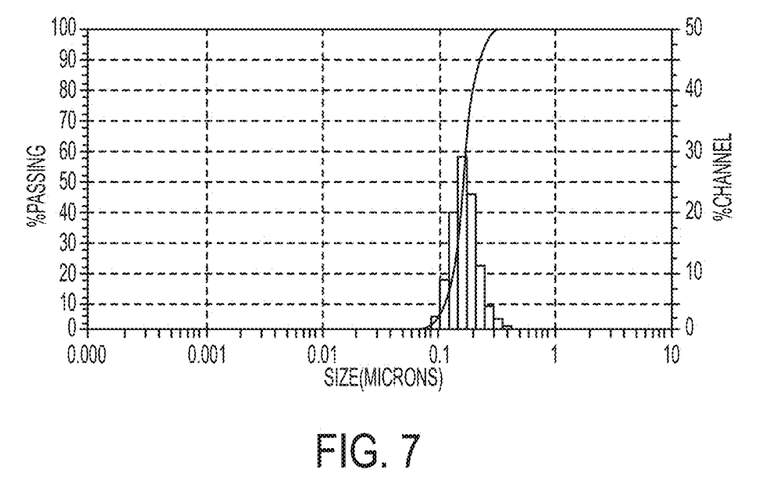
FIG. 7 is a graph illustrating particle size and particle size distribution of the latex made in Comparative Example 2.

Into a 250 ml plastic bottle was added 60 grams of bio based amorphous polyester resin 2 (Mw=83460, Tg onset=58.7 C), 60 grams of methyl ethyl ketone, 6 grams of iso-propyl alcohol. The bottle was capped and heated in stirring water bath at 60° C. overnight to dissolve the resin. After being cooled to room temperature, 5.29 grams of 10 wt % $NH_3.H_2O$ solution (calculated by the formula: Neutralization Rate×Amount of Resins in grams x Acid Number x 0.303× $10^{-2}$) was then added drop-wise to the mixture to neutralize the resin. After $NH_3.H_2O$ and resin solution were shook for about 1 min, about 60 grams of DIW was added drop-wise to the mixture at intervals with shaking. The average particle size is about 163 nm as shown in FIG. 7.

Example 2

This example was also prepared with the magnetic actuated mixing of the present embodiments.

Figure 8:
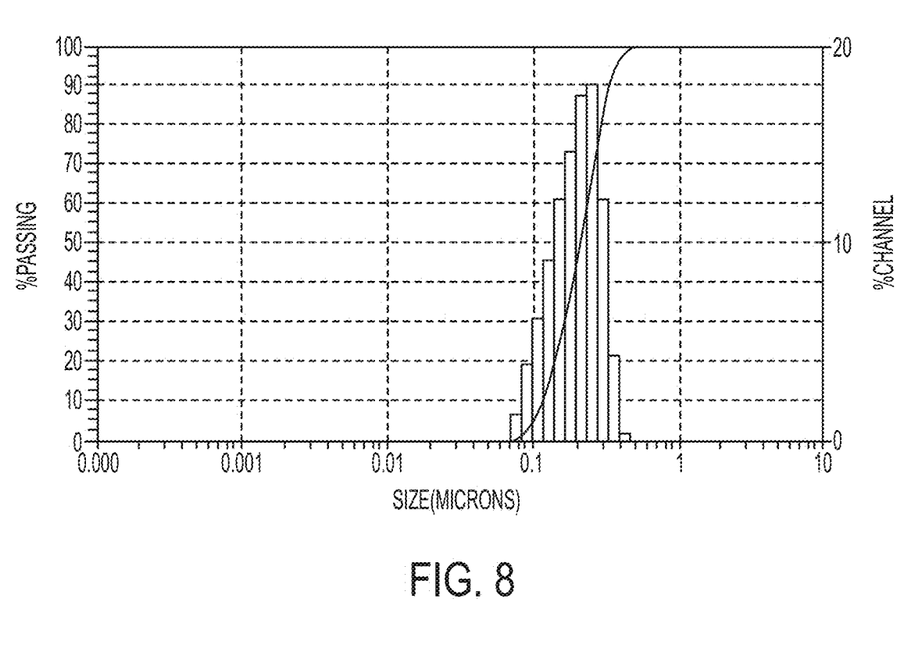
FIG. 8 is a graph illustrating particle size and particle size distribution of the latex made in Example 2.

Into a 250 ml plastic bottle was added 60 grams of bio based amorphous polyester resin 2 (Mw=83460, Tg onset=58.7 C), 60 grams of methyl ethyl ketone, 6 grams of iso-propyl alcohol. The bottle was capped and heated in stirring water bath at 60° C. overnight to dissolve the resin. After being cooled to room temperature, 2.1 g of the mixture was transferred to a 10 ml glass vial with 0.5 g micro magnetic particles (Carbonyl Iron Powder from Royalink Industries Corp., average particle size ~4 to 5 μm). 0.09 grams of 10 wt % $NH_3.H_2O$ solution was then added drop-wise to the mixture to neutralize the resin. Then the mixture was mixed by magnetic particles through turning the vial next to the fastened permanent magnet for 1 min. About 2 grams of DIW was added drop-wise to the mixture at intervals with mixing with magnetic particles. The particle size and particle size distribution were subsequently analyzed. The average particle size is about 209 nm as shown in FIG. 8.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for mixing one or more materials to prepare latex particles, comprising:
    a) contacting a resin with an organic solvent, an optional surfactant, and an optional neutralizing agent in a vessel to form a resin composition in the vessel;
    b) contacting the resin composition with deionized water (DIW) in the vessel;
    c) adding magnetic particles into the vessel; and
    d) applying a varying magnetic field to the magnetic particles to move the magnetic particles to mix the resin composition in the vessel to generate a latex or emulsion, wherein the step of applying the varying magnetic field to the magnetic articles creates a plurality of localized micron or submicron mixing zones providing substantially uniform latex particles.

2. The method of claim 1, wherein a neutralization ratio of the neutralization agent in the latex or emulsion is from 25% to 500%.

3. The method of claim 1, wherein the organic solvent is selected from the group consisting of a ketone, an alcohol, an ester, an ether, a nitrile, a sulfone, a sulfoxide, a phosphoramide, a benzene, a benzene derivative, an amine, and mixtures thereof.

4. The method of claim 1, wherein the resin is selected from the group consisting of polyester, polyacrylate, polyolefin, polystyrene, polycarbonate, polyamide, polyimide, and mixtures thereof.

5. The method of claim 1, wherein the resin is a polyester.

6. The method of claim 1, wherein the latex or emulsion has a mono distribution of particle size from about 5 nm to about 1000 nm.

7. The method of claim 1, wherein the neutralizing agent is selected from the group consisting of ammonium hydroxide, sodium carbonate, potassium hydroxide, sodium hydroxide, sodium bicarbonate, lithium hydroxide, potassium carbonate, triethyl amine, triethanolamine, pyridine, pyridine derivatives, diphenylamine, diphenylamine derivatives, poly(ethylene amine), poly ethylene amine) derivatives, amine bases, and piperazine, and mixtures thereof.

8. The method of claim 1, further including collecting the magnetic particles for reusing at a later time.

9. The method of claim 1, wherein the magnetic particles are comprised of a, paramagnetic, ferrimagnetic, ferromagnetic or antiferromagnetic material.

10. The method of claim 1, wherein the magnetic particles have a non-magnetic coating.

11. The method of claim 1, wherein the magnetic particles have a particle diameter size of from about 5 nm to about 50 μm.

12. The method of claim 1, wherein the magnetic field has a strength of from about 500 Gauss to about 20,000 Gauss.

13. The method of claim 1, wherein the magnetic field is applied through one or more electromagnets.

14. The method of claim 1, wherein the magnetic field is applied to drive magnetic particles in a circular, up and down, left and right, or triangular motion.

15. The method of claim 1, wherein the varying magnetic field is applied by moving a permanent magnet.

16. The method of claim 1, wherein the desired latex particle size is from about 5 nm to about 1,000 nm.

17. A method for mixing one or more materials to prepare toner particles, comprising:
   a) contacting a resin with an organic solvent and an optional neutralizing agent in a vessel to form a resin composition in the vessel;
   b) contacting the resin composition with deionized water (DIW) in the vessel;
   c) adding magnetic particles into the vessel;
   d) applying a varying magnetic field to the magnetic particles to move the magnetic particles to mix the resin composition in the vessel to generate a latex or emulsion;
   e) particles from a pre-toner mixture, the pre-toner mixture comprising the latex or emulsion, an optional colorant, and an optional wax; and
   f) coalescing the aggregated particles to form toner particles.

* * * * *